United States Patent [19]

Das

[11] 4,093,976
[45] June 6, 1978

[54] ACOUSTO-OPTIC IMAGE SCANNER

[75] Inventor: Pankaj K. Das, Cohoes, N.Y.

[73] Assignee: The United States of America as represented by the Secretary of the Navy, Washington, D.C.

[21] Appl. No.: 717,974

[22] Filed: Aug. 26, 1976

[51] Int. Cl.² ............ H04N 9/10; H04N 3/10; G02F 1/11; H04N 5/30

[52] U.S. Cl. ............ 358/53; 358/201; 358/209; 358/48; 350/356; 358/41; 350/358

[58] Field of Search ............ 358/53, 63, 214, 54, 358/41, 44, 201, 48, 62, 50, 61, 209; 250/221, 222 R; 350/161 W, 161 S, 161 P

[56] References Cited

U.S. PATENT DOCUMENTS

| 2,807,799 | 9/1957 | Rosenthal | 358/60 |
| 3,851,951 | 12/1974 | Eveleth | 358/201 |

OTHER PUBLICATIONS

Alippi et al., "Image Scanning Through the Acousto-Optical Effect Produced by Acoustic Surface Waves", Applied Physics Letters, vol. 26, No. 7, Apr. 1, 1975, pp. 357–360.

Primary Examiner—John C. Martin
Attorney, Agent, or Firm—R. S. Sciascia; L. I. Shrago

[57] ABSTRACT

An acousto-optic image scanner employing pulses of acoustic surface waves which propagate along the length of a piezoelectric crystal performing as a traveling phase grating to diffract a collimated monochromatic light beam which has a spatial light distribution corresponding to the information content of a line of the image. The light beam propagates through the width of the crystal thus providing an extensive electro-optic interaction length for increased diffraction efficiency. The light intensity at a first-order spot is detected to provide a temporal signal representative of the light distribution of an image line. Scanning of colored images can be accomplished by utilizing a chromatic beam and detecting the light at the first-order spots corresponding to the three different wavelengths present in the illuminating beam.

10 Claims, 1 Drawing Figure

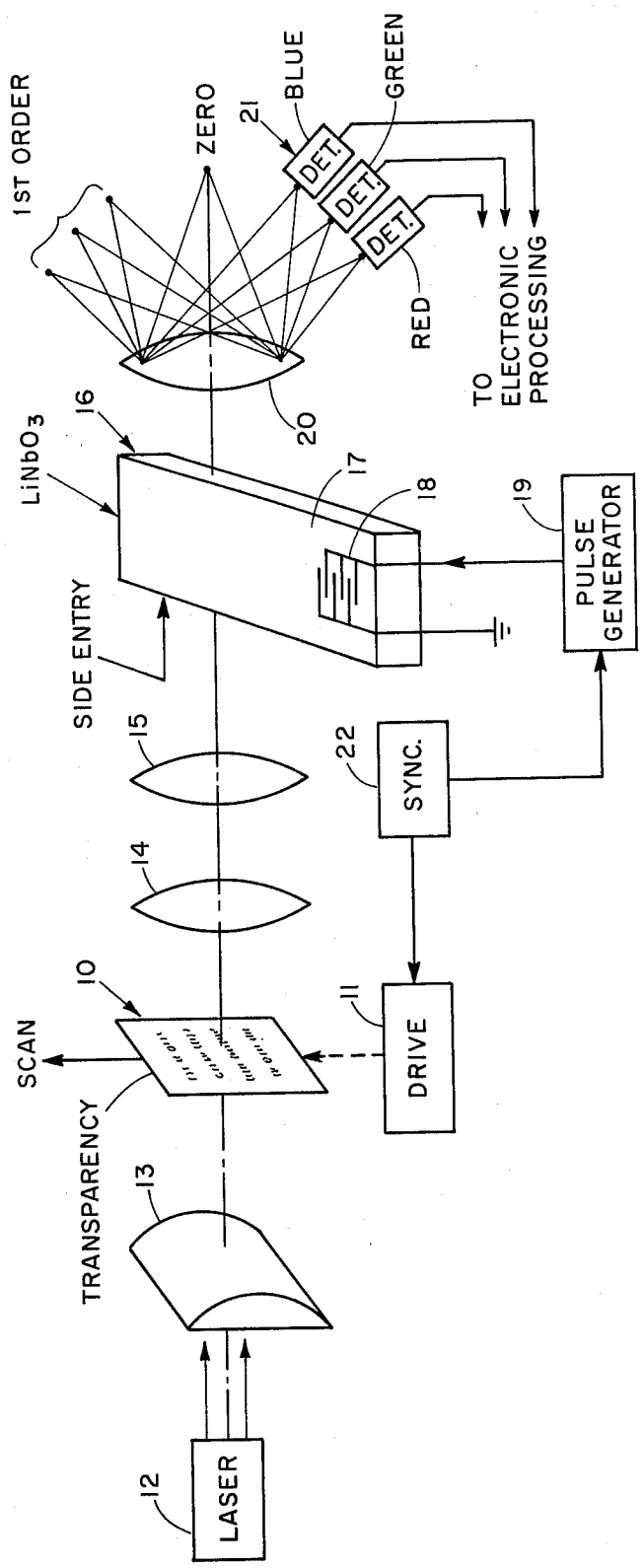

ACOUSTO-OPTIC IMAGE SCANNER

The present invention relates generally to apparatus for and methods of scanning a one or two-dimensional light distribution so as to produce a temporal representation of the spatial intensity.

The transformation of a light intensity distribution into a time varying signal has been accomplished in the past by utilizing pulses of acoustic surface waves which propagate along a boundary surface of a piezoelectric crystal and perform as a traveling phase grating to diffract an incident collimated beam. The acoustic pulses essentially perform a sampling function, and their movement results in a temporal signal in the diffraction orders describing the spatial variations in the intensity distribution. In one arrangement, the optical geometry is selected such that the incident light beam propagates in a direction normal to that of the acoustic wave propagation and is reflected from the back surface of the piezoelectric crystal, the one opposite that on which the acoustic surface wave travels. Because of this back surface reflection, the light beam twice crosses the acoustic surface waves. This two-way crossing substantially increases the length of the acoustic-optic interaction region, and in doing so, substantially increases the amount of light scattered into a first-order of the light spectrum and the efficiency of the scanning system. However, the acoustic-optic interaction length in this scanner is still essentially determined by the depth of penetration of the surface acoustic wave. This dimension is ordinarily only about an acoustic wavelength. Thus, for example, with an LiNbO$_3$ piezoelectric crystal and an acoustic frequency of approximately 100 MHz, this critical distance is approximately 36 $\mu$m. The actual interaction length, because of the two-way crossing, is 72 $\mu$m, a two-fold improvement.

It is, accordingly, an object of the present invention to provide an improved one or two-dimensional image scanner utilizing pulses of acoustic surface waves as the sampling probe.

Another object of the present invention is to provide an image scanner having an interaction region of increased length which corresponds to the full width of the acoustic beam.

A still further object of the present invention is to provide an acoustic-optic image scanner wherein the interaction region corresponds to the spread of the collimated light beam and the full width of the acoustic beam.

A yet further object of the present invention is to provide an acoustic-optic image scanner wherein the light beam and the acoustic beam travel in parallel planes and the interaction region resulting therefrom has an increased size.

Briefly, and in somewhat general terms, the above objects of invention are accomplished by having the collimated light beam carrying one-dimensional image information enter the piezoelectric crystal near and parallel to the surface on which the pulses of acoustic surface waves propagate. This parallel relationship of beams results in a substantial increase in the length of the acoustic-optic interaction region for whereas in the arrangement hereinbefore described where these beams have a normal relationship and the interaction length is established by the penetration depth of the surface waves, here, this length is determined by the full width of the acoustic beam. Consequently, the interaction length now depends upon the aperture of the interdigital transducer which launches the surface acoustic waves. Thus, with lithium niobate as the piezoelectric crystal and the acoustic frequency still approximately 100 MHz, an interaction length of 3.7 mm is attainable, a 54-fold improvement.

Referring now to the drawing, the single FIGURE of which illustrates one embodiment of the invention, the light distribution pattern which is to be scanned and transformed into a time varying signal is here represented by appropriate image or intensity markings recorded on a film transparency 10. A suitable mechanical drive mechanism 11 is associated with transparency 10 for moving it intermittently in a vertical direction past the optical axis of the apparatus. In this way, successive horizontal lines forming the image or the recorded data are illuminated by coherent light originating from laser 12 which may be an argon laser tuned to a single light frequency. The laser beam is vertically focused to a line by cylindrical lens 13. Its lateral dimension is restricted or otherwise collimated so that a relatively uniform beam is available for scanning each separate line of transparency 10.

Imaging lenses 14 and 15 function to produce a line focus of the transparency image within piezoelectric crystal 16. As mentioned hereinbefore, the geometry of the system is such that the collimated light beam enters piezoelectric crystal 16 near and parallel to surface 17, the surface on which the pulses of acoustic surface waves travel. These pulses are launched by an interdigital transducer 18 which is formed by well-known techniques adjacent to one end of an LiNbO$_3$ crystal which is Y-cut, Z-propagating. Each pulse of acoustic surface waves thus scan that line of the image then being illuminated by laser 12.

The parallel relationship existing between the plane of the optical beam and the plane along which the acoustic surface waves travel, as noted hereinbefore, improves the diffraction efficiency of the system. This is due to the fact that the optical beam now propagates through the complete width of the acoustic beam. In doing so, it establishes a considerably greater acousto-optical interaction length than prior art systems. The width of the acoustic beam, it will be appreciated, is determined solely by the aperture of the interdigital transducer 18.

In the performance of the overall system, the acoustic surface waves produce a phase grating which is encountered by the incident collimated beam, and the diffraction which results therefrom is in the Raman-Nath regime or in the Bragg region.

After the collimated light beam propagates through the crystal and interacts with the acoustic surface wave, the diffracted light emerging from crystal 16 is Fourier transformed by spherical lens 20. Only the resultant first-order diffraction spots are shown in the FIGURE, however, other spots are also present when the Raman-Nath regime is employed. The light intensity appearing in any of the diffracted orders is proportional to the square of the integral of the amplitude distribution over the length of the acoustic pulse. Consequently, there is a direct trade-off between signal power and spatial resolution capability. If the acoustic pulse is made very short compared to the spatial intensity variations but remains long enough to contain a number of cycles of the carrier frequency so as to be a grating, the acoustic pulse essentially performs a sampling function. This sampling point moves as the acoustic pulse moves and results in a temporal signal in the diffracted order describing the spatial variations in the intensity distribution. It is in this manner that scanning is accomplished. Consequently, to obtain this temporal signal, a suitable photodetector 21 is positioned in the transform plane of lens 20 at a location which, in the example shown, corresponds to that at which the first-order diffraction spot appears. The output of the photodetector, therefore, provides a temporal sequence of signals which replicates the spatial brightness of the image on transparency 10 along one of its two dimensions, which here corresponds to the horizontal one.

It would be pointed out that the spatial resolution obtainable with the above system corresponds to the pulse velocity times the pulse length. Thus, on $LiNbO_3$, a 50 nsec. pulse results in a spatial resolution of about 0.17 mm.

It would be noted that since the angle of diffraction depends upon the wavelength of the light, in this case the argon laser 12, simultaneous scanning in different colors could be done on a single piezoelectric crystal. This mode of operation can be employed to provide scanning of multi-color transparencies. In such an application, the incident light is composed of several colors such as red, green and blue laser light colinearly combined previous to their incidence on the transparency. The first-order diffracted light resulting from the scanning operation exists at a different angle for each color. This is also true for all higher orders. Consequently, three photodiodes, one for each color, are employed to detect the light. The signals from these photodiodes, after suitable amplification, can be multiplexed for transmission, if desired. In one embodiment utilizing this technique, the illuminating light was red light from an HeNe laser at 6328 A combined with green and blue light at 5145 A and 4880 A, respectively, from an argon laser.

The excitation of transducer 18 and the launching of pulses of acoustic surface waves is controlled by pulse generator 19 whose periodic activation is governed by synchronizing circuit 22. This circuit also controls mechanical drive 11 and insures that the vertical advancement of the transparency is timed correctly so that one line after another of the recorded image is effectively scanned.

What is claimed is:

1. A 1-D acousto-optic colored image scanner, comprising in combination
    a piezoelectric crystal;
    means for launching pulses of acoustic surface waves along a planar boundary surface of said crystal;
    means for forming a colored image of the light distribution pattern which is to be scanned within said crystal, the light beam producing said colored image propagating within said crystal in a plane which is parallel and adjacent to said planar boundary surface such that said light beam and said pulses of acoustic surface wave interact with said pulses behaving as a traveling phase grating to diffract said light beam;
    means for Fourier transforming the diffracted light emerging from said piezoelectric crystal; and
    means for detecting the light appearing at the first-order diffracted image locations.

2. In an arrangement as defined in claim 1 wherein said light beam crosses the complete width of said acoustic surface waves so as to provide an increased acousto-optic interaction length.

3. In an arrangement as defined in claim 1 wherein said light beam consists of the co-linear combination of three different wavelengths.

4. In an arrangement as defined in claim 3 wherein said means for detecting the light appearing at the first-order diffracted image locations comprises three photodetectors.

5. An acousto-optic image scanner, comprising in combination
    a piezoelectric crystal;
    means for launching pulses of acoustic surface waves along a planar boundary surface of said crystal in a first direction;
    means for directing a monochromatic light beam through said crystal in a second direction which is perpendicular to said first direction,
        said light beam propagating through said crystal in a plane that is parallel to said boundary surface,
        said light beam having a spatial intensity distribution which corresponds to the information content of a line of said image,
            each pulse of acoustic surface waves performing as a traveling phase grating to diffract said light beam;
    means for focusing the light diffracted from said phase grating; and
    means for detecting the intensity of the first-order diffracted light thereby to provide a temporal signal indicative of the spatial intensity of said image line.

6. In an arrangement as defined in claim 5 wherein said acoustic surface waves travel along the length of said crystal and wherein said monochromatic light beam propagates through the width of said crystal.

7. An acousto-optic 1-D image scanner, comprising in combination
    a piezoelectric crystal;
    means for launching pulses of acoustic surface waves along the length of said crystal;
    means for directing a light beam having a spatial intensity which corresponds to the information content of one line of said image through the width of said crystal,
        said light beam being focused to a line image within said crystal and propagating through said crystal in a plane which is adjacent and parallel to the surface of said piezoelectric crystal along which said pulses of acoustic surface waves travel whereby said light beam and said acoustic surface waves interact over the complete width of said surface waves,
        said pulses of acoustic surface waves performing as a traveling phase grating to diffract said light beam;
    means for focusing the light emerging from said crystal; and
    means for detecting the intensity of the light constituting a first-order diffracted spot thereby to develop a temporal signal which replicates the information content of said image line.

8. In an arrangement as defined in claim 7 wherein said light beam crosses said acoustic surface waves at right angles.

9. In an arrangement as defined in claim 7 wherein said light beam consists of the co-linear combination of three different wavelengths.

10. In an arrangement as defined in claim 9 wherein means for detecting the intensity of the light constituting a first-order diffracted spot comprises three photodetectors.

* * * * *